(12) United States Patent
Pajukoski et al.

(10) Patent No.: US 6,839,326 B1
(45) Date of Patent: Jan. 4, 2005

(54) ANTENNA PHASE ESTIMATION ALGORITHM FOR WCDMA CLOSED LOOP TRANSMITTER ANTENNA DIVERSITY SYSTEM

(75) Inventors: Kari Pajukoski, Oulu (FI); Ilkka Keskitalo, Oulu (FI); Erkki Autio, Oulu (FI); Pasi Kinnunen, Oulu (FI)

(73) Assignee: Nokia Corporation, Espoo (FI)

(*) Notice: Subject to any disclaimer, the term of this patent is extended or adjusted under 35 U.S.C. 154(b) by 965 days.

(21) Appl. No.: 09/669,746

(22) Filed: Sep. 26, 2000

(51) Int. Cl.$^7$ ............ G01R 31/08; H04Q 7/00; H04B 7/216

(52) U.S. Cl. ........ 370/252; 370/238; 370/334; 370/335

(58) Field of Search ............. 370/252, 334, 370/335, 238, 230, 338, 255; 375/260, 267, 299, 358; 455/69, 101, 562.1; 708/514

(56) References Cited

U.S. PATENT DOCUMENTS

| | | | |
|---|---|---|---|
| 6,611,675 B1 * | 8/2003 | Salonen et al. | 455/69 |
| 6,748,024 B2 * | 6/2004 | Kuchi et al. | 375/299 |
| 6,754,286 B2 * | 6/2004 | Hottinen et al. | 375/299 |
| 6,766,144 B2 * | 7/2004 | Kim et al. | 455/67.11 |

* cited by examiner

*Primary Examiner*—Duc Ho
(74) *Attorney, Agent, or Firm*—Harrington & Smith, LLP

(57) ABSTRACT

This invention teaches a method for use in a wideband CDMA telecommunications system wherein the base station (BS) utilizes transmit antenna diversity. The method enables the user equipment (UE) to perform a channel estimate for channels received from two antennas of the base station (BS), and includes steps of: (a) computing an estimated phase difference between a common pilot channel and a dedicated pilot channel received from one antenna of the two antennas; and (b) determining the channel estimate by rotating a common pilot channel estimate according to the estimated phase difference, where the phase difference is computed as a complex coefficient between the common pilot channel and the dedicated pilot channel. In a second aspect this invention teaches a method for use in a transmit antenna diversity system for enabling the UE to verify an antenna phase shift previously signaled by the UE to the BS. This method includes a first step of: (a) exploiting prior knowledge of BS rotation angle by considering a vector x that includes all hypotheses for complex rotation coefficients of the BS with respect to all possible rotation angles, in accordance with a decision rule for an estimation of a complex rotation coefficient. A second step of the method evaluates a cost function of a hypothesis m by considering the prior knowledge.

12 Claims, 4 Drawing Sheets

$$\hat{m}_j = \arg \min_{m \in \{1,2,3,4\}} \Omega(m_j)$$

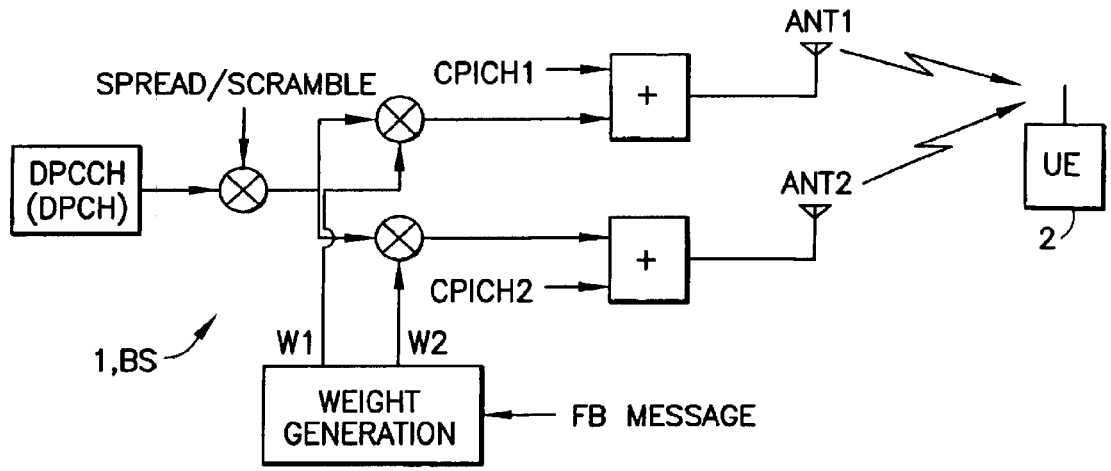
FIG. 1A
PRIOR ART
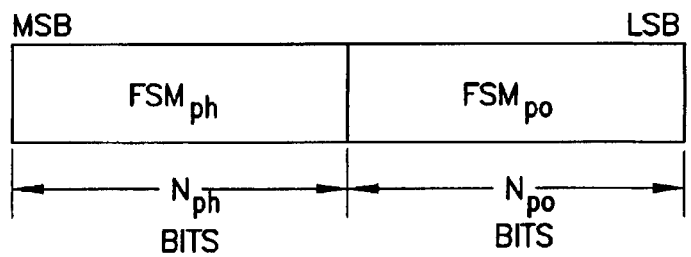
FIG. 1B
PRIOR ART
| FB MODE | $N_{FBD}$ | $N_W$ | UPDATE RATE | FEEDBACK BIT RATE | $N_{ph}$ | $N_{po}$ |
|---|---|---|---|---|---|---|
| 1 | 1 | 1 | 1500 Hz | 1500 bps | 0 | 1 |
| 2 | 1 | 4 | 1500 Hz | 1500 bps | 1 | 3 |
FIG. 1C
PRIOR ART $$2\sqrt{2}\gamma \sum_{l=0}^{L} \text{Re}[\hat{h}_{2,l}^{(d)} \hat{h}_{2,l}^{(c)}] \cdot (\sigma_l^2)^{-1} > \ln\left[\frac{\rho(\phi_{Rx}=\pi)}{\rho(\phi_{Rx}=0)}\right]$$

FIG.2A
PRIOR ART $$2\sqrt{2}\gamma \sum_{l=1}^{L} \text{Im}[\hat{h}_{2,l}^{(d)} \hat{h}_{2,l}^{(c)}] \cdot (\sigma_l^2)^{-1} > \ln\left[\frac{\rho(\phi_{Rx}=-\pi/2)}{\rho(\phi_{Rx}=\pi/2)}\right]$$

FIG.2B
PRIOR ART

WHERE $\hat{h}_{2,l}^{(d)}$ = THE CHANNEL ESTIMATE FOR TAP $l$ OF THE DIVERSITY BRANCH THAT IS OBTAINED USING DPCCH, $\hat{h}_{2,l}^{(c)}$ = THE CHANNEL ESTIMATE FOR TAP $l$ OF THE DIVERSITY BRANCH THAT IS OBTAINED USING CPICH, $\gamma^2$ = THE RATIO BETWEEN THE DPCH PILOT POWER AND THE CPICH PILOT POWER, $\sigma_l^2$ = THE VARIANCE OF THE NOISE AND INTERFERENCE FOR EACH CHANNEL ESTIMATE $\hat{h}_{2,l}^{(d)}$, $\rho(\phi_{Rx}=\pi)$ = FOR THE CHOSEN HYPOTHESIS THIS IS THE PROBABILITY THAT THE FEEDBACK BIT WAS NOT IN ERROR.

$$\hat{w} = \frac{\underline{h}_2^{c^T} \underline{h}_2^d}{\left|\underline{h}_2^{c^T} \underline{h}_2^d\right|}$$

FIG.3A $$\hat{\underline{c}} = \underline{h}_1^c + \hat{w}\underline{h}_2^c$$

FIG.3B $$\varphi_j \in \{\varphi_{j+1}, (\varphi_{j-1} + \frac{\Pi}{2}) \bmod 2\Pi, \;, (\varphi_{j-1} - \frac{\Pi}{2}) \bmod 2\Pi\}$$

FIG.4A $$\underline{x} = [\sqrt{2} + i\sqrt{2} \quad -\sqrt{2} + i\sqrt{2} \quad -\sqrt{2} - i\sqrt{2} \quad \sqrt{2} - i\sqrt{2}\,]$$

FIG.4B $$\hat{m}_j = \arg\min_{m \in \{1,2,3,4\}} \Omega(m_j)$$

FIG.4C

ANTENNA PHASE ESTIMATION ALGORITHM FOR WCDMA CLOSED LOOP TRANSMITTER ANTENNA DIVERSITY SYSTEM

FIELD OF THE INVENTION

This invention relates generally to wireless telecommunications equipment and systems and, more particularly, to fixed site or base station equipment that uses antenna diversity transmission techniques to mobile phones or stations, also referred to herein as user equipment (UE).

BACKGROUND OF THE INVENTION

One modem wireless telecommunications system that is presently under development is commonly referred to as a third generation (3G) wideband code division/multiple access (WCDMA) system. It is proposed in the 3G-WCDMA system to use closed loop, feedback mode transmitter diversity. FIG. 1A depicts a presently proposed downlink (base station (BS) to user equipment (UE)) transmitter structure 1 for supporting closed loop transmit diversity. In FIG. 1 DPCH refers to a dedicated control channel and CPICH refers to common pilot channel. The DPCH includes a (dedicated) pilot signal channel (DPCCH) and a data signal, which is channel coded and interleaved before being spread and scrambled. The spread complex valued signal is fed to two transmitter antenna branches (Ant1 and Ant2), and weighted with antenna-specific weight factors w1 and w2, respectively. The weight factors are complex valued signals. The weight factors (actually the corresponding phase adjustments) are determined by the UE 2, and are signaled to the BS 1 through an uplink DPCCH.

There are actually two feedback modes, which are uniquely identified by the mode specific antenna weight value set. The structure of the feedback signaling message (FSM) is shown in FIG. 1B, where it can be seen that the FSM has two parts. The first part of the FSM is $FSM_{ph}$, which transmits the phase setting, while the second part is $FSM_{po}$, which transmits the power setting. FIG. 1C is a table that summarizes the characteristics of the feedback mode, where $N_{FBD}$ is the number of feedback bits per slot, $N_W$ is the length of the feedback command in slots, update rate is the feedback command rate, $N_{po}$ is the number of power bits, and $N_{ph}$ is the number of phase bits per signaling word.

The UE 2 uses the common pilot channel CPICH to separately estimate the channels seen from each antenna (Ant1 and Ant2). Once every slot the UE 2 chooses amongst the mode-specific transmit weight set an optimum weight which, when applied at the BS 1, maximizes the received power at the UE 2. The UE 2 then feeds back to the BS 1 the FSM, which informs the BS 1 of which power/phase settings should be used. If $N_{po}$ is zero, then equal power is applied to both transmit antennas.

In the first feedback mode equal power is applied to Ant1 and Ant2, and the UE 2 must then only determine the phase adjustment between Ant1 and Ant2. This is done using channel estimates computed from the CPICH. The BS 2 averages the phases of two consecutive slots, implying that the possible transmit weights in the feedback mode 1 are exactly the QPSK constellation points.

It can thus be appreciated that in the closed loop transmit diversity mode of operation the user equipment 2 determines an optimal phase shift for the BS transmission antennas (Ant1 and Ant2) and transmits a (one bit) feedback (FB) command to the BS. The BS uses two successive one bit FB commands to determine transmission weights w1 and w2 for antennas Ant1 and Ant2, respectively, when transmitting the DPCCH to the UE 2. The weight for Ant1 (w1) is always unity, while the weight for Ant2, w2, has values of $e^{i\phi}$, where $\phi \in \{\pi/4, 3\pi/4, -\pi/4, -3\pi/4\}$.

In the proposed embodiment of FIG. 1A the BS 1 uses orthogonal common pilot patterns for the CPICH channels of antennas 1 and 2. These channels are common to all UEs 2 in the cell area, and are transmitted without UE-specific transmission weights. However, a UE 2 will typically wish to utilize CPICH channels in channel estimation due to the higher transmission power resulting in a more reliable channel estimation. In order to properly combine the channel estimates corresponding to CPICH1 and CPICH2, the UE 2 must know the transmission weight w2 that was utilized by the BS 1. A more detailed description of the mode 1 closed loop transmit diversity can be found in the 3GPP specification TS25.214:"Physical layer procedures (FDD)".

However, the feedback channel that is used to transmit the FSMs from the UE 2 to the BS 1, which are employed by the BS 1 to steer the phase shift of antenna 2, is not error free. As such, due to reception errors in the feedback channel the BS 1 may not always transmit the DPCCH using the optimal phase shift determined by the UE 2. Since the UE utilizes the common pilot channels in the channel estimation it must know the value of w2, i.e., the phase shift applied at ANT2. Without this knowledge the UE 2 will combine the CPICH-based channel estimates assuming a zero phase shift for antenna 2, resulting in an incorrect channel estimate and a degradation in UE performance.

An example algorithm for the determination of the transmit antenna weight is presented in the above mentioned 3GPP specification TS25.214:"Physical layer procedures (FDD)". The proposed algorithm utilizes a priori probabilities for the transmission weights, i.e., it assumes that the phase shift corresponding to a feedback command that was sent is more probable than a transmission weight corresponding to an inverted FB command (the FB command changed by an error in the feedback channel). The algorithm determines whether it is more probable that a feedback error occurred than that a feedback error did not occur and, based on this decision, the algorithm selects the transmission weight w2 corresponding to the sequence of transmitted feedback commands, modified according to determined feedback error occurrences.

This proposed algorithm requires knowledge of the relative power levels of the dedicated and common pilot channels, as well as knowledge of the variance of the noise plus interference. However, a reliable estimation of noise variance is a computationally expensive task and is thus undesirable for execution by the UE 2. While some form of variance estimation is required, in a rapidly changing signal propagation environment the averaging times should be made short, and thus the reliability of the estimate is low. The same considerations and problems apply to the estimation of the relative power levels of the dedicated and the common pilot channels, especially when the dedicated channel power is varied by a fast power control algorithm.

It can be appreciated that problems exist in the mode 1 closed loop transmit diversity operation described above.

OBJECTS AND ADVANTAGES OF THE INVENTION

It is a first object and advantage of this invention to provide an improved technique for the user equipment to determine the value of w2.

It is another object and advantage of this invention to provide a method for the user equipment to verify the value of w2, where the method does not require an estimation of the noise variance or the relative powers of the dedicated and common pilot channels.

It is another object and advantage of this invention to provide a method for the user equipment to verify the value of w2, where the method in one aspect does not require a determination of a priori probabilities of feedback commands sent to the BS, while in another aspect provides a simpler technique to use the a priori probabilities.

SUMMARY OF THE INVENTION

The foregoing and other problems are overcome and the foregoing objects and advantages are realized by methods and apparatus in accordance with embodiments of this invention.

In one aspect this invention teaches a method for use in a wideband CDMA telecommunications system wherein the base station (BS) utilizes transmit antenna diversity. The method enables the user equipment (UE) to perform a channel estimate for channels received from two antennas of the base station (BS), and includes steps of: (a) computing an estimated phase difference between a common pilot channel and a dedicated pilot channel received from one antenna of the two antennas; and (b) determining the channel estimate by rotating a common pilot channel estimate according to the estimated phase difference, where the phase difference is computed as a complex coefficient between the common pilot channel and the dedicated pilot channel.

In a second aspect this invention teaches a method for use in a transmit antenna diversity system for enabling the UE to verify an antenna phase shift previously signaled by the UE to the BS. This method includes a first step of: (a) exploiting prior knowledge of BS rotation angle by considering a vector x that includes all hypotheses for complex rotation coefficients of the BS with respect to all possible rotation angles, in accordance with a decision rule for an estimation of a complex rotation coefficient of the form $\hat{\alpha}=x(\hat{m}_j)$. A second step of the method evaluates a cost function of a hypothesis m by considering the prior knowledge. The step (b) of evaluating the cost function of the hypothesis m may be performed in accordance with both feedback information and phase adjustment statistics, as follows:

$$\Omega(m_j) = \begin{cases} f(x(m_j), w^\wedge, a) & \text{if } m_j = u_j \\ f(x(m_j), w^\wedge, b) & \text{if } x(m_j) = -x(m^\wedge_{j-1}) \\ f(x(m_j), w^\wedge) & \text{if } m_j \neq u_j \text{ or } x(m_j) \neq -x(m^\wedge_{j-1}) \end{cases}$$

where $f(x(m_j), w^\wedge)$ is the function of the complex rotation hypothesis $x(m_j)$ and estimated phase difference $w^\wedge$, $u_j$ is the index of the complex rotation hypothesis of vector x and is calculated from the feedback bits transmitted by the UE. The statistic of the BS phase adjustment is taken into account by performing the decision variable $\Omega(m_j)$, respecting the hypothesis that $x(m_j)=-x(m^\wedge_{j-1})$ for the function of the estimated phase difference, complex rotation hypothesis and constant a. The feedback bits information transmitted by the UE is taken into account by performing the decision variable $\Omega(m_j)$, respecting the hypothesis that $m_j=u_j$ for the function of the estimated phase difference, complex rotation hypothesis and constant b. Otherwise the decision variable $\Omega(m_j)$ is performed as a function of the phase difference and complex rotation hypothesis.

The cost function of the hypothesis m may also performed by exploiting the feedback information, as shown below:

$$\Omega(m_j) = \begin{cases} f(x(m_j), w^\wedge, a) & \text{if } m_j = u_j \\ f(x(m_j), w^\wedge) & \text{if } m_j \neq u_j \end{cases}$$

The feedback bits information transmitted by the UE is taken into account by performing the decision variable $\Omega(m_j)$, respecting the hypothesis that $m_j=u_j$ for the function of the estimated phase difference, complex rotation hypothesis and constant a. Otherwise, $(m_j \neq u_j)$ and the decision variable is performed as a function of the phase difference and the complex rotation hypothesis.

The step of evaluating the cost function of the hypothesis m may also be performed in accordance with the prior knowledge of the BS phase adjustment, as follows:

$$\Omega(m_j) = \begin{cases} f(x(m_j), w^\wedge, b) & \text{if } x(m_j) = -x(m^\wedge_{j-1}) \\ f(x(m_j), w^\wedge) & \text{if } x(m_j) \neq -x(m^\wedge_{j-1}) \end{cases}$$

The statistic of the BS phase adjustment is taken into account by performing the decision variable $\Omega(m_j)$, respecting the hypothesis that $x(m_j)=-x(m^\wedge_{j-1})$ for the function of the estimated phase difference, complex rotation hypothesis and constant b. Otherwise, $x(m_j) \neq -x(m^\wedge_{j-1})$ and the decision variable is performed as a function of the phase difference and the complex rotation hypothesis.

In the preferred embodiment the system is also a wideband CDMA system wherein the BS transmits to the UE using two antennas.

BRIEF DESCRIPTION OF THE DRAWINGS

The above set forth and other features of the invention are made more apparent in the ensuing Detailed Description of the Invention when read in conjunction with the attached Drawings, wherein:

FIG. 1A is a diagram of a proposed 3G-WCDMA base station transmitter arrangement, showing two antenna diversity and the generation of weights for phase shifting dedicated user equipment transmissions at only one of the two antennas;

FIG. 1B shows the structure of a proposed feedback signaling message (FSM);

FIG. 1C is a table that summarizes the characteristics of two proposed feedback modes of operation;

FIGS. 2A and 2B depict mathematical expressions used in a previously proposed antenna phase verification procedure;

FIGS. 3A and 3B depict mathematical expressions used in two embodiments of the method of this invention;

FIGS. 4A, 4B and 4C depict mathematical expressions that are useful in understanding the second embodiment of the method of this invention; and FIGS. 5A and 5B are graphs that contrast the performance of the first method versus the second method relative to the performance expected from a previously specified algorithm, wherein FIG. 5A shows a simulated case of a vehicular UE (120 kmh) speech service application, and wherein FIG. 5B shows a simulated case of 144 kbits/sec packed data service application at pedestrian speeds of 3 kmh, wherein a feedback error rate of 4% was assumed for the 144 kbits/sec case, and an error rate of 20% was assumed for the speech service case.

DETAILED DESCRIPTION OF THE INVENTION

Figure 5A:
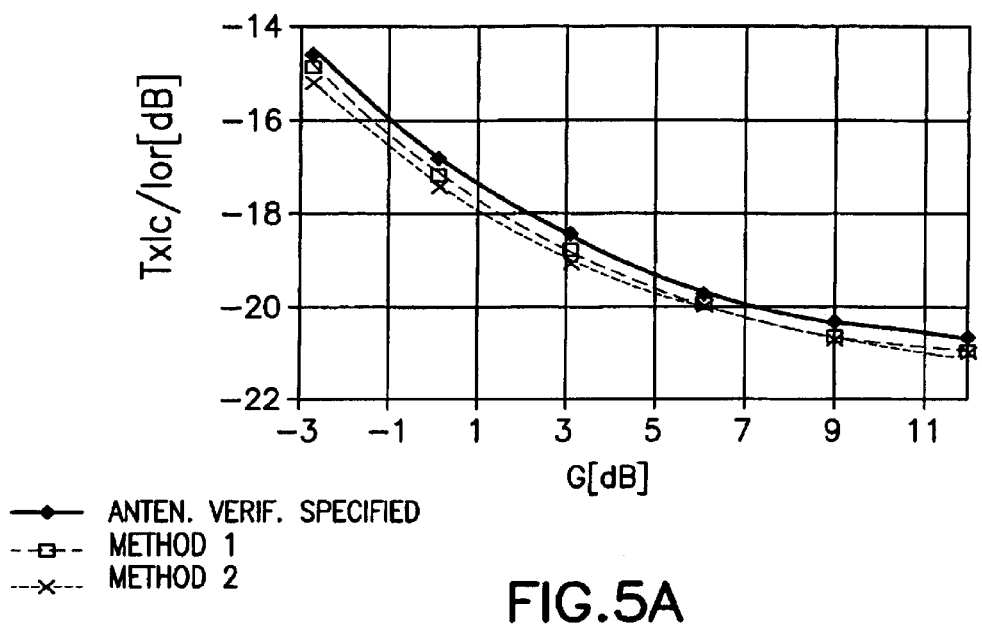

Before further describing the methods of this invention it may be instructive to review the previously proposed antenna verification procedure specified in the above mentioned 3GPP specification TS25.214:"Physical layer procedures (FDD)", specifically 3G TS 25.214 V3.2, 2000–03, p. 37. The antenna verification algorithm for feedback mode 1 uses channel estimates obtained from the pilot symbols of the DPCCH. Hence, the pilot pattern of the DPCCH from the two antennas need to be orthogonal. The algorithm applies a two hypothesis test for each slot assuming that the feedback bit corresponding to the considered slot is known, as well as the error percentage of the feedback bits at the BS 1. If one assumes the hypothesis that no feedback error has occurred if $\phi_{Rx}=\pi$, then there has been a feedback error if the condition shown in FIG. 2A is found to hold.

Equivalently, the imaginary part of w2 is determined for odd slots. If one assumes that no feedback error has occurred if ($\phi_{Rx}=-\pi/2$), then there has been an error in the feedback bit if the condition shown in FIG. 2B is found to hold.

The foregoing technique can be considered to implement a form of MAP estimation of the feedback commands received by the BS 1.

In accordance with a first embodiment of this invention, the UE 2 computes the phase difference between the CPICH and the DPDCH channels received from Ant2, and then the final channel estimate is performed for rotating the CPICH channel estimate according to the estimated phase difference. The phase difference is calculated as a complex coefficient between the DPDCH and the CPICH channels transmitted by Ant2 in accordance with the expression shown in FIG. 3A, wherein the column vector $h_2^d$ represents the estimated channel coefficients for Ant2 computed from DPCH pilots, and column vector $h_2^c$ represents the estimated channel coefficients for Ant2 computed from CPICH pilots. When the CPICH is used for channel estimation, the channel estimates used for the maximal ratio combining are computed in accordance with FIG. 3B, wherein $h_1^c$ represents the estimated channel coefficients for Ant1 computed from CPICH pilots, and $c\hat{}$ is the column channel estimate vector to be used for maximal ratio combining.

In accordance with a second method of this invention, the following prior knowledge, according to the above-referenced 3GPP specification TS25.214:"Physical layer procedures (FDD)", is exploited: (1) the feedback command transmitted by the UE 2 and (2) the quantization of the rotation angle $\phi$ in the transmitter structure of the BS 1. According to the specification, there are the four possible rotation angles mentioned previously, i.e.: $\{\pi/4, 3\pi/4, -/4, -3\pi/4\}$. The statistics of the rotation angle is handled by the transmitter structure of the BS 1. Since the BS 1 calculates the rotation angle using a sliding average technique over two consecutive slots of the received phases, there are only three possible rotation angles during online operation, as shown in FIG. 4A, wherein $\phi_j$ is the most recent rotation angle of the BS 1 transmitter, and where $\phi_{j-1}$ is the rotation angle used in the previous timeslot.

This prior knowledge of rotation angle is exploited in a simple way by this embodiment of the invention. More particularly, vector x includes all hypotheses for complex rotation coefficients of the BS 1 with respect to all possible rotation angles, as shown in FIG. 4B. The decision rule for the estimation of the complex rotation coefficient is of the form shown in FIG. 4C, where m is the index of the complex rotation hypothesis of vector x. The estimate of the complex rotation coefficient is then $\hat{\alpha}=x(\hat{m}_j)$. The cost function of the hypothesis m is then performed by exploiting the feedback information, as shown below for the case:

$$\Omega(m_j) = \begin{cases} f(x(m_j), w\hat{}, a) & \text{if } m_j = u_j \\ f(x(m_j), w\hat{}) & \text{if } m_j \neq u_j \end{cases}$$

where $f(x(m_j))$ is the function of the complex rotation hypothesis $x(m_j)$ and estimated phase difference $w\hat{}$, $u_j$ is the index of the complex rotation hypothesis of vector x and is calculated from the feedback bits transmitted by the UE 2. The feedback bits information transmitted by the UE 2 is taken into account by performing the decision variable $\phi(m_j)$, respecting the hypothesis that $m_j=u_j$ for the function of the estimated phase difference, complex rotation hypothesis and constant a. Otherwise, ($m_j \neq u_j$) and the decision variable is performed as a function of the phase difference and the complex rotation hypothesis.

The step of evaluating the cost function of the hypothesis m may be performed in accordance with the prior knowledge of the BS 1 phase adjustment, as follows:

$$\Omega(m_j) = \begin{cases} f(x(m_j), w\hat{}, b) & \text{if } x(m_j) = -x(\hat{m}_{j-1}) \\ f(x(m_j), w\hat{}) & \text{if } x(m_j) \neq -x(\hat{m}_{j-1}) \end{cases}$$

where $f(x(m_j))$ is the function of the complex rotation hypothesis $x(m_j)$ and estimated phase difference $w\hat{}$, and $x(\hat{m}_{j-1})$ is the previously estimated rotation coefficient. The statistic of BS 1 phase adjustment is taken into account by performing the decision variable $\Omega(m_j)$, respecting the hypothesis that $x(m_j)=-x(\hat{m}_{j-1})$ for the function of the estimated phase difference, complex rotation hypothesis and constant b. Otherwise, $x(m_j) \neq -x(\hat{m}_{j-1})$ and the decision variable is performed as a function of the phase difference and the complex rotation hypothesis.

The step of evaluating the cost function of the hypothesis m may be performed in accordance with both feedback information and phase adjustment statistics, as follows:

$$\Omega[m]_j) = \begin{cases} f(x(m_j), w\hat{}, a) & \text{if } m_j = u_j \\ f(x(m_j), w\hat{}, b) & \text{if } x(m_j) = -x(\hat{m}_{j-1}) \\ f(x(m_j), w\hat{}) & \text{if } m_j \neq u_j \text{ or } x(m_j) \neq -x(\hat{m}_{j-1}) \end{cases}$$

The statistic of the BS 1 phase adjustment is taken into account by performing the decision variable $\Omega(m_j)$, respecting the hypothesis that $x(m_j)=-x(\hat{m}_{j-1})$ for the function of the estimated phase difference, complex rotation hypothesis and constant b. The feedback bits information transmitted by the UE 2 is taken into account by performing the decision variable $\Omega(m_j)$, respecting the hypothesis that $m_j=u_j$ for the function of the estimated phase difference, complex rotation hypothesis and constant a. Otherwise the decision variable $\Omega(m_j)$ is performed as a function of the phase difference and complex rotation hypothesis.

The statistic of BS 1 phase adjustment may be taken into account by multiplying it by the decision variable $\Omega(m_j)$, respecting the phase of the previously estimated rotation coefficient $-x(\hat{m}_{j-1})$ for constant b (b>1).

for $m_j = 1$ to 4

$$\Omega(m_j) = |x(m_j) - w\hat{}|^2$$

if $x(m_j) = -x(\hat{m}_{j-1})$

-continued $$\Omega(m_j) = b\Omega(m_j)$$

if $m_j = u_j$ $$\Omega(m_j) = a\Omega(m_j)$$

end where $u_j$ is the index of the complex rotation hypothesis of vector x and is calculated from the feedback bits transmitted by the UE 2, i.e., $u_j$ respects the complex rotation done without decision errors.

A further aspect of the teachings of this invention is intended for use in a transmit antenna diversity system, and relates to a method for enabling UE 2 to verify an antenna phase shift previously signaled by the UE 2 to the BS 1. This method includes steps of (a) computing an estimated phase difference between the common pilot channel (CPICH) and the dedicated pilot channel (DPCCH) received from one antenna of the plurality of antennas, (b) quantizing the estimated phase difference according to prior knowledge of BS 1 rotation angles; and (c) determining the channel estimate by rotating a common pilot channel estimate according to the quantized phase difference. The prior knowledge of the BS 1 rotation angles is determined by minimizing the decision rule:

$$\hat{m}_j = \arg\min_{m \in \{1,2,\ldots,q\}} \Omega(m_j),$$

where q is the number of possible weight values, and where the decision rule for the cost function $\Omega(m_j)$ is $$\Omega(m_j) = |x(m_j) - \hat{w}|,$$

where $x(m_j)$ is the complex rotation hypothesis and $\hat{w}$ is the estimated phase difference.

Figure 5B:
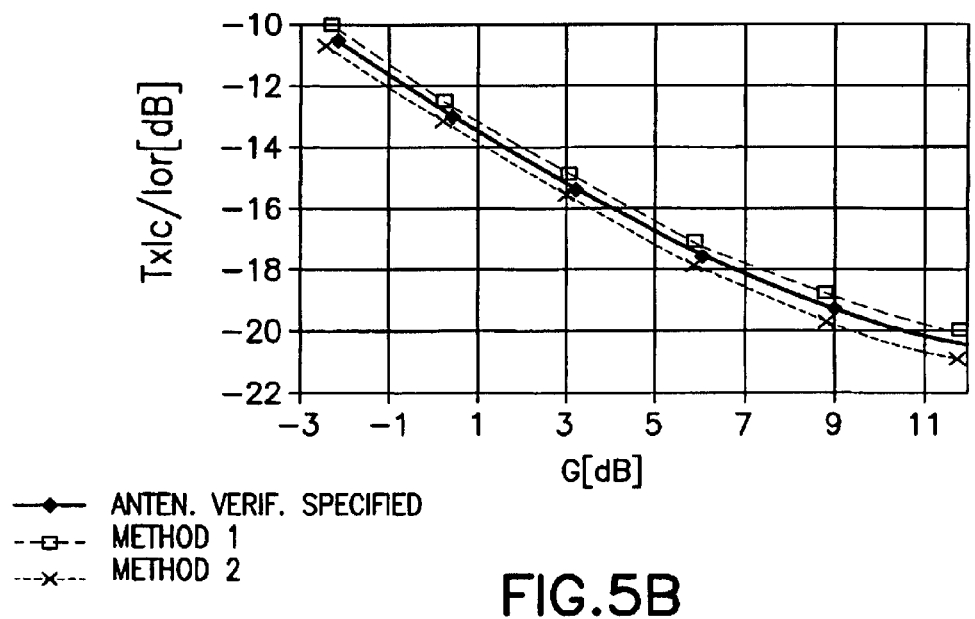

FIGS. 5A and 5B are graphs that contrast the performance of the first method versus the second method described above, in contrast to the performance expected from the specified algorithm in the above-mentioned 3GPP specification TS25.214:"Physical layer procedures (FDD)", wherein FIG. 5A shows a simulation of a vehicular UE (120 kmh) speech service application where the feedback error percentage may be as high as 20%, while FIG. 5B shows a simulated case of 144 kbits/sec packed data service application at a pedestrian speed of 3 kmh. The curves give the percentage of the power of the BS 1 that is consumed for the user as a function of a geometry parameter G. The geometry parameter G can be given as $I_c/I_{or}$ in which $I_c$ denotes the total received power at the UE 2 from the nearest BS 1, and where $I_{or}$ describes the received power from all other base stations, as well as the thermal noise. The other-cell interference is preferably modeled as AGWN. As such, G may be considered to represent the distance between the UE 2 and its' serving base station.

G=ratio of own cell transmit power to the other cell interference power (as seen at the UE 2)

$I_c$=average transmit power of own signal $I_{or}$=average transmit power of other signals Tx_$I_c/I_{or}$=average desired signal Tx-power ratio to total base station Tx-power It can be seen that the second method of this invention provides the best performance for both cases shown in FIGS. 5A and 5B, even when simulated with constant values for a and b. Furthermore, the first embodiment of the method performs almost as well as the second embodiment with a large feedback error rate. Also, the second method also appears to provide better performance than the more complex antenna verification algorithm that is proposed in the above-mentioned 3GPP specification TS 25.214:"Physical layer procedures (FDD)".

In general, the first method may be preferred if there is no prior knowledge of the BS 1 phase slips available, while the second method may be preferred when this information is available to the UE 2.

While the invention has been particularly shown and described with respect to preferred embodiments thereof, it will be understood by those skilled in the art that changes in form and details may be made therein without departing from the scope and spirit of the invention.

What is claimed is:

1. In an antenna diversity system, a method for enabling a user equipment (UE) to perform a channel estimate for a channel received from a base station (BS), comprising steps of:

computing an estimated phase difference between a common pilot channel and a dedicated pilot channel received from one antenna of the antenna diversity system; and determining the channel estimate by rotating a common pilot channel estimate according to the estimated phase difference, wherein the phase difference is computed as a complex coefficient between the common pilot channel and the dedicated pilot channel.

2. A method as in claim 1, wherein the system is a wideband CDMA system wherein the BS transmits to the UE using two antennas.

3. In a wideband CDMA telecommunications system wherein a base station (BS) utilizes transmit antenna diversity, a method for enabling a user equipment (UE) to perform a channel estimate for channels received from two antennas of the base station (BS), comprising steps of:

computing an estimated phase difference between a common pilot channel and a dedicated pilot channel received from one antenna of the two antennas; and determining the channel estimate by rotating a common pilot channel estimate according to the estimated phase difference, wherein the phase difference is computed as a complex coefficient between the common pilot channel and the dedicated pilot channel.

4. In a transmit antenna diversity system, a method for enabling a user equipment (UE) to verify an antenna phase shift previously signaled by the UE to a base station (BS), comprising steps of:

exploiting prior knowledge of BS rotation angle by considering a vector x that includes all hypotheses for complex rotation coefficients of the BS with respect to all possible rotation angles, in accordance with a decision rule for an estimation of a complex rotation coefficient of the form $\hat{a} = x(\hat{m}_j)$, and evaluating a cost function of a hypothesis m by considering the prior knowledge.

5. A method as in claim 4, wherein the step of evaluating the cost function of the hypothesis m is performed in accordance with feedback information as follows:

$$\Omega(m_j) = \begin{cases} f(x(m_j), \hat{w}, a) & \text{if } m_j = u_j \\ f(x(m_j), \hat{w}) & \text{if } m_j \neq u_j \end{cases}$$

where $f(x(m_j)$ is the function of the complex rotation hypothesis $x(m_j)$ and estimated phase difference $\hat{w}$, $u_j$ is the index of the complex rotation hypothesis of vector x and is calculated from feedback bits transmitted by the UE, wherein the feedback bits information transmitted by the UE is taken into account by performing the decision variable $\Omega(m_j)$, respecting the hypothesis that $m_j=u_j$ for the function of the estimated phase difference, complex rotation hypothesis and constant a, otherwise ($m_j \neq u_j$) and the decision variable is performed as a function of the phase difference and the complex rotation hypothesis.

6. A method as in claim 4, wherein the step of evaluating the cost function of the hypothesis m is performed in accordance with prior knowledge of BS phase adjustment, as follows:

$$\Omega(m_j) = \begin{cases} f(x(m_j), w^\wedge, b) & \text{if } x(m_j) = -x(m_{j-1}^\wedge) \\ f(x(m_j), w^\wedge) & \text{if } x(m_j) \neq -x(m_{j-1}^\wedge) \end{cases}$$

where $f(x(m_j)$ is the function of the complex rotation hypothesis $x(m_j)$ and estimated phase difference $w^\wedge$, and $x(m^\wedge_{j-1})$ is a previously estimated rotation coefficient wherein a statistic of BS phase adjustment is taken into account by performing the decision variable $\Omega(m_j)$, respecting the hypothesis that $x(m_j)=-x(m^\wedge_{j-1})$ for the function of the estimated phase difference, complex rotation hypothesis and constant b, otherwise $x(m_j) \neq -x(m^\wedge_{j-1})$ and the decision variable is performed as a function of the phase difference and the complex rotation hypothesis.

7. A method as in claim 4, wherein the step of evaluating the cost function of the hypothesis m is performed in accordance with both feedback information and BS phase adjustment statistics, as follows:

$$\Omega(m_j) = \begin{cases} f(x(m_j), w^\wedge, a) & \text{if } m_j = u_j \\ f(x(m_j).w^\wedge, b) & \text{if } x(m_j) = -x(m^\wedge_{j-1}) \\ f(x(m_j), w^\wedge) & \text{if } m_j \neq u_j \text{ or } x(m_j) \neq -x(m^\wedge_{j-1}) \end{cases}$$

where $f(x(m_j)$ is the function of the complex rotation hypothesis $x(m_j)$ and estimated phase difference $w^\wedge$, $u_j$ is the index of the complex rotation hypothesis of vector x and is calculated from the feedback bits transmitted by the UE, wherein the statistic of the BS phase adjustment is taken into account by performing the decision variable $\Omega(m_j)$, respecting the hypothesis that $x(m_j)=-x(m^\wedge_{j-1})$ for the function of the estimated phase difference, complex rotation hypothesis and constant b, where the feedback bits information transmitted by the UE is taken into account by performing the decision variable $\Omega(m_j)$, respecting the hypothesis that $m_j=u_j$ for the function of the estimated phase difference, the complex rotation hypothesis and using a constant a, otherwise the decision variable is performed as a function of the phase difference and the complex rotation hypothesis.

8. A method as in claim 4, wherein the step of evaluating the cost function of the hypothesis m is performed in accordance with:

for $m_j = 1$ to 4

$$\Omega(m_j) = |x(m_j) - w^\wedge|^2$$

if $x(m_j) = -x(m^\wedge_{j-1})$ $$\Omega(m_j) = b\Omega(m_j)$$

if $m_j = u_j$ $$\Omega(m_j) = a\Omega(m_j)$$

end where $u_j$ is an index of the complex rotation hypothesis of vector x and is calculated from feedback bits transmitted by the UE, wherein the feedback bits information transmitted by the UE is taken into account by multiplying by a decision variable $\Omega(m_j)$, respecting the hypothesis that $m_j=u_j$ for constant a (a<1), and accounting for a statistic of BS phase adjustment by multiplying it by the decision variable $\Omega(m_j)$, respecting the phase of the previously estimated rotation coefficient $-x(m^\wedge_{j-1})$ for constant b (b>1).

9. A method as in claim 4, wherein the system is a wideband CDMA system wherein the BS transmits to the UE using two antennas.

10. In a transmit antenna diversity system, a method for enabling a user equipment (UE) to verify an antenna phase shift previously signaled by the UE to a base station (BS), comprising steps of:

computing an estimated phase difference between a common pilot channel and a dedicated pilot channel received from one antenna of a plurality of transmit antennas;

quantizing the estimated phase difference according to prior knowledge of BS rotation angles; and determining the channel estimate by rotating a common pilot channel estimate according to the quantized phase difference.

11. A method as in claim 10, wherein the prior knowledge of the BS rotation angles is determined by minimizing the decision rule:

$$\hat{m}_j = \arg \min_{m \in \{1,2,\ldots,q\}} \Omega(m_j),$$

where q is the number of possible weight values, and where the decision rule for the cost function $\Omega(m_j)$ is $$\Omega(m_j) = |x(m_j) - w^\wedge|$$

where $x(m_j)$ is the complex rotation hypothesis and $w^\wedge$ is the estimated phase difference.

12. A method as in claim 10, wherein the system is a wideband CDMA system wherein the BS transmits to the UE using two antennas.

* * * * *